United States Patent [19]

Kumasaka et al.

[11] 4,325,688
[45] Apr. 20, 1982

[54] MOLD EQUIPMENT

[75] Inventors: Sadao Kumasaka, Tanashi; Satomi Tada, Tokyo; Goro Yoneyama, Kawagoe; Junichi Seki, Kiyose, all of Japan

[73] Assignee: Toyo Rubber Chemical Industrial Corporation, Tokyo, Japan

[21] Appl. No.: 168,282

[22] Filed: Jul. 10, 1980

[30] Foreign Application Priority Data

Jul. 16, 1979 [JP] Japan ................................ 54-90011

[51] Int. Cl.³ ............................................. B29D 27/04
[52] U.S. Cl. ........................................ 425/436 R; 264/51; 264/236; 264/347; 425/261; 425/817 R
[58] Field of Search ............... 425/436 R, 261, 817 R; 264/236, 347, 51

[56] References Cited

U.S. PATENT DOCUMENTS

| 1,693,264 | 11/1928 | Waner | 264/347 |
|---|---|---|---|
| 2,500,352 | 3/1950 | 264 | 176 R/ |
| 2,921,336 | 1/1960 | Crafton | 425/261 X |
| 2,997,739 | 8/1961 | Smith et al. | 264/347 |
| 3,243,491 | 3/1966 | Bethe | 264/50 X |
| 3,612,159 | 10/1971 | Galinsky | 425/436 X |
| 3,880,970 | 4/1975 | Dinzburg et al. | 264/347 X |
| 4,154,561 | 5/1979 | Virtanen | 425/470 X |
| 4,215,730 | 8/1980 | Oswald | 264/51 X |

FOREIGN PATENT DOCUMENTS

| 1251488 | 12/1960 | France | 264/347 |
|---|---|---|---|
| 413040 | 3/1972 | U.S.S.R. | 425/261 |
| 469601 | 8/1975 | U.S.S.R. | 425/261 |

*Primary Examiner*—Philip Anderson
*Attorney, Agent, or Firm*—Frishauf, Holtz, Goodman and Woodward

[57] ABSTRACT

A mold equipment comprises a water tub having a metal mold transfer conveyor therein, a first lift chamber for placing the metal mold onto a first lift from the outlet side of said conveyor and lifting it to an upper stage of the first lift chamber, a first push-in cylinder for transferring the metal mold from the outlet of the first lift chamber into a ceiling oven including a conveyor and held in an atmosphere of curing, a second lift chamber for placing said metal mold onto a second lift from the outlet of the ceiling oven and lowering it to a lower stage outlet, a second push-in cylinder for transferring the metal mold from the outlet of the second lift chamber into a mold release work station including a conveyor, a third lift chamber for placing the metal mold onto a third lift at the outlet of the mold release work station and lowering it to the position of the mold transfer conveyor in the water tub, and a third push-in cylinder for transferring the metal mold into the water tub from the outlet of said third lift chamber.

15 Claims, 4 Drawing Figures

F I G. 2
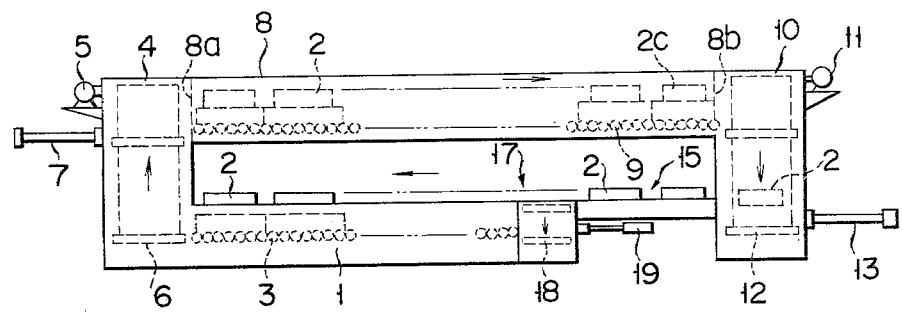
F I G. 3
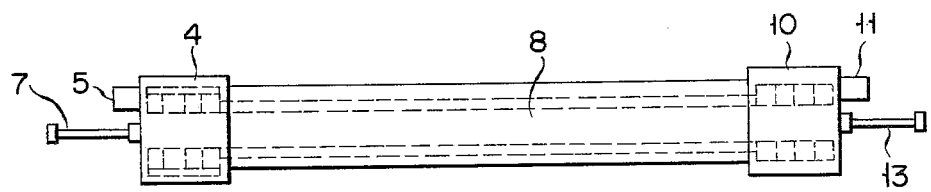
F I G. 4
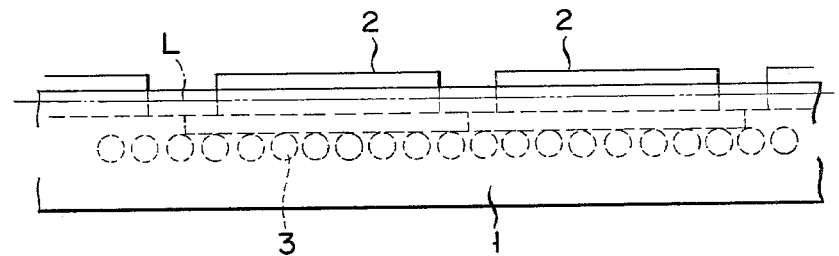

MOLD EQUIPMENT

BACKGROUND OF THE INVENTION

This invention relates to an improved mold equipment which can mold a synthetic resin such as polyurethane foam.

Hard and semi-hard polyurethane foams are popular in fields such as a rolling stock cushions and furniture cushions. These foams are manufactured in a hot mold equipment and semi-hot mold equipment. In the mold equipment, a mold transfer conveyor is horizontally arranged in an endless fashion at a certain level on a floor and a mold is circulatingly moved such that the infusion of a solution for foam, curing under heating, cooling and mold releasing are effected at a speed of about 5 m/min. In this method, the apparatus becomes bulky and the manufacturing line has a great total length (usually more than 100 m), making it difficult to obtain a saving in energy and labor.

In the curing step, heating is effected at 200° to 300° C. and the subsequent step requires a longer cooling zone in which air or a cooling shower is applied. Use is normally made of a heating oven using hot air as a heat source. The inlet and outlet of the metal mold are opened and closed each time the metal mold is moved into and out of the oven. Thus, a lowering in heat efficiency, as well as a greater consumption of a heavy oil due to the dissipation of the hot air, is involved.

A conveyor is continuously run over the whole length of the manufacturing line and the processing time is adjusted for each step. If the whole process is treated at the same speed, an attendant on each process is required (usually 10 or more attendants).

It is accordingly an object of this invention to provide a mold equipment which has a shorter manufacturing line, can achieve a saving in labor and energy, is lower in equipment cost and which can easily release a foamed article from a mold.

SUMMARY OF THE INVENTION

According to this invention there is provided a mold equipment comprising a water tub having a metal mold transfer conveyor therein, a first lift chamber for placing a metal mold onto a first lift from the outlet side of said mold transfer conveyor and lifting it to an upper stage of the first lift chamber, a first push-in cylinder for transferring the metal mold from the outlet of the first lift chamber into a ceiling oven which includes a conveyor and which is held in an atomosphere of curing, a second lift chamber for placing said metal mold onto a lift from the outlet of the ceiling oven and lowering it to a lower outlet stage, a second push-in cylinder for transferring the metal mold from the lower outlet stage of the second lift chamber into a mold release work station including a conveyor, a third lift chamber for placing the metal mold onto a lift from the outlet of said mold release work station and lowering it to the position of the mold transfer conveyor in the water tub, and a third push-in cylinder for transferring said metal mold from the outlet of the third lift chamber onto the water tub.

BRIEF DESCRIPTION OF THE DRAWINGS

FIG. 2 is a front view of the mold equipment of FIG. 1;

FIG. 3 is a top view of the mold equipment of FIG. 1; and

FIG. 4 is a side view showing a water vessel of the mold equipment as shown in FIG. 1.

DETAILED DESCRIPTION

Figure 1:
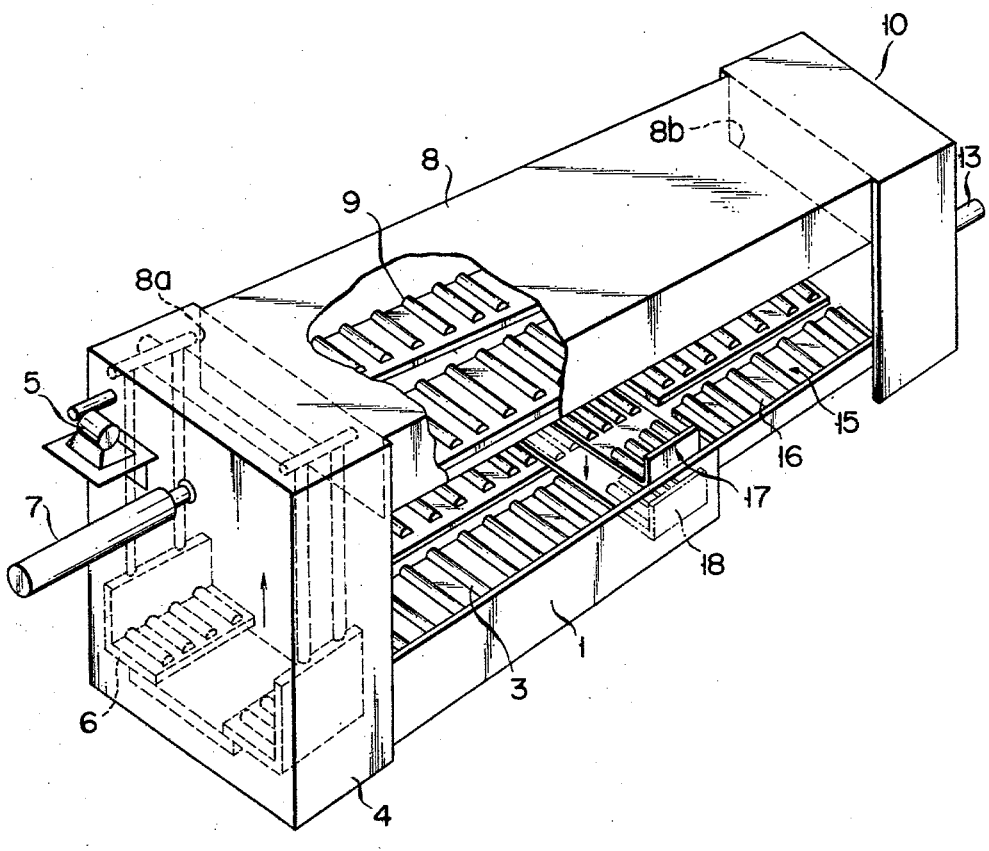
FIG. 1 is a perspective view showing a mold equipment according to one embodiment of this invention.

FIG. 1 is a perspective view showing a mold equipment as applied to the molding of polyurethane foam. FIG. 2 is a front view of the FIG. 1 mold equipment and FIG. 3 is a top view of the FIG. 1 mold equipment. Reference numeral 1 is a horizontally extending water vessel or tub. A roller conveyor 3 for conveying a plurality of metal molds 2 from an inlet to an outlet of the water vessel 1 is arranged such that it is submerged in the water. The major portion of the metal mold 2 can be submerged with the upper portion exposed. Where there is a risk that water will invade into the metal mold 2 through its mating line, the water level L is maintained below the mating line of the metal mold as shown in FIG. 4. A first lift chamber 4 is disposed at the outlet of the water vessel 1 such that the bottom thereof is on the same plane as the bottom of the water vessel 1. The first lift chamber 4 has a lift or elevator 6 which is moved up and down by a motor 5 within the chamber 4. The metal mold 2 is conveyed to the left to the outlet end of the roller conveyor 3 and lifted by the lift 6 to the upper stage in the chamber 4. An inlet 8a of a ceiling oven 8 is opened on the upper side wall of the first lift chamber 4 and a push-in cylinder 7 for the metal mold 2 is fixed on that upper side wall of the chamber 4 which faces the inlet 8a. The push-in cylinder 7 is adapted to push the lifted metal mold 2 into the ceiling oven 8. The ceiling oven 8 includes a roller conveyor 9 for permitting the metal mold 2 to be run in the longitudinal direction of the oven 8. Hot steam is filled within the oven 8 to provide a curing atmosphere. The high level ceiling oven 8 has an inlet and outlet for hot steam and a temperature adjuster etc. and can be arbitrarily adjusted to a temperature necessary for curing under heating. For the ceiling oven 8, use may be made of not only the above-mentioned steam type ceiling oven, but also a ceiling oven using hot air or electric heat as a heating source. The outlet 8b of the ceiling oven 8 is opened at the side upper wall of a second lift chamber 10 which is opposite to the first lift chamber 4.

The bottom of the second lift chamber 10 is connected to the inlet of a mold releasing work station 15 which is under an atmosphere of room temperature. The second lift chamber 10 has a lift 12 which is moved up and down by a motor 11 within the chamber 10. The mold 2 is carried from the outlet 8b of the ceiling oven 8 onto the lift 12 and then the lift 12 is moved down in the chamber. The mold 2 transferred to the bottom of the second lift chamber 10 is shifted on the mold releasing work station 15 by a push-in cylinder 13 secured to the bottom of the second lift chamber 10. The mold releasing work station 15 includes a roller conveyor 16 for conveying the metal mold 2 and is filled with air under room temperature so as to gradually cool the metal mold 2 after curing. A third lift chamber 17 is provided at the output of the mold releasing work station 15. A lift 18 is provided in the third lift chamber 17, and the empty metal mold 2 from which a foamed article is released at the mold release work station 15 is transferred via lift 18 to the water vessel 1 for immersion in the water. A push-in cylinder 19 is fixed to the lower portion of the third lift chamber 17 to shift the metal mold 2 into the water tub 1.

A mold releasing agent is coated on the inner surface of the metal mold 2 which is conveyed by a roller conveyor 3 in the water tub. Then, the metal mold is cooled at a predetermined temperature and a foamable composition containing diisocyanate and polyol, etc., is injected. The metal mold 2 injected with the composition is shifted to the lift 6 in the first lift chamber 4 disposed on the exit of the water vessel 1. The lift 6 is lifted to the upper portion of the first lift chamber 4. The mold 2 lifted to the upper portion is shifted by the push-in cylinder 7 into the ceiling oven 8. Since the ceiling oven 8 is held by hot steam at the curing atmosphere, the foamable solution is cured in the metal mold 2 while the metal mold 2 is run through the ceiling oven 8. After curing, the metal mold is shifted from the ceiling oven 8 to the lift 12 in the second lift chamber 10 and lowered to the bottom of the second lift chamber 10. The metal mold 2 so lowered is shifted by a push-in cylinder 13 onto the mold release work station 15. The mold 2 heated to 100° to 200° C. in the ceiling oven 8 is run through the mold releasing work station 15 by way of the second lift chamber 10. Since the mold release work station 15 is held at an atmosphere of room temperature, the metal mold is held at a temperature of about 50° to 70° C. without being quickly chilled. When the mold 2 is at about 50° to 70° C. the foamed article in the mold 2 is released from the metal mold 2. As the metal mold 2 is held at the temperature, the mold releasing operation can be easily effected, while preventing the curing of the mold releasing agent. The empty metal mold 2 is transferred from the mold release work station 15 to the lift 18 in the third lift chamber 17 and is lowered to the position of the roller conveyor 3 submerged in the water vessel 1. Then, the empty metal mold 2 is transferred to the roller conveyor 3 in the water tub 1 by the push-in cylinder 19 mounted on the lower portion of the third lift chamber 17. In this way, the same operation is repeated in a process of the mold releasing, cooling, injection of a foamable material and curing under heating.

Since in this mold equipment a foamed article is released from the mold in the mold release work station held at an atmosphere of room temperature, even if a mold releasing agent which is cured at a temperature below room temperature is coated on the metal mold 2, the mold releasing operation can be readily effected, while preventing the curing of the mold releasing agent.

The ceiling oven 8 is located above the water tub 1 and mold releasing work station 15 with the lift chambers 4, 10 one at each side of the spanned oven 8, creating a circulation path including the lift chamber 4, water tub 1, ceiling oven 8, the lift chamber 10 and the mold release work station 15. As a result, the mold equipment can be designed to have a very short manufacturing line (usually 20 to 30 m), permitting a compact design.

The ceiling oven 8 requires no opening and closing operation with respect to the inlet and outlet thereof when the metal mold 2 is moved into and out of the ceiling oven 8. Since the oven 8 spans the upper side of the mold equipment, it is possible to decrease leakage of a curing atmosphere such as steam. The roller conveyors 9, 16 and 3 are used in the transfer of the metal mold 2 in the ceiling oven 8, metal mold working station 15 and water tub, permitting a saving in power for the transfer of the metal mold 2. The running speed of the metal mold 2 can be arbitrarily adjusted by the push-in cylinders 7, 13 and 19 which are mounted on the lift chambers 4, 10 and 17.

The mold equipment of this invention contributes greatly to a saving in energy and labor, as well as the lowering of equipment cost. In order to elevate productivity a plurality of roller conveyors can be arranged in the water tub 1 and ceiling oven 8 with the ceiling oven spanning a plurality of juxtaposed stages and a plurality of juxtaposed water tubs.

As the conveyors are disposed in the water tub and ceiling oven a roller conveyor as has been explained in the embodiment of the invention is practically preferable. This invention is not restricted thereto. Any type may be employed if the metal mold is of a self-transfer type. The mold equipment of this invention can achieve a lowering in equipment cost as well as in a saving in power and energy.

What we claim is:

1. A mold equipment using a metal mold, comprising:

a water tub for cooling a metal mold, said water tub having a metal mold transfer conveyor therein, said mold transfer conveyor having an inlet and an outlet side;

a first lift chamber having an inlet coupled to the outlet side of said mold transfer conveyor for receiving the metal mold and including a first lift in the first lift chamber for lifting the received metal mold to an upper outlet stage of the first lift chamber;

a ceiling oven including a conveyor and means for maintaining a hot curing atmosphere therein, said ceiling oven having an inlet coupled to said outlet stage of the first lift chamber for receiving a metal mold from the first lift chamber, said ceiling oven having an outlet side;

a first push-in cylinder coupled to the first lift chamber for transferring the metal mold from the upper outlet stage of the first lift chamber onto said conveyor of said ceiling oven;

a second lift chamber having an inlet coupled to the outlet side of said ceiling oven for receiving the metal mold from said ceiling oven, after being conveyed through said ceiling oven, and including a second lift in the second lift chamber for lowering the received metal mold to a lower outlet stage of the second lift chamber;

a mold release work station coupled to receive the metal mold from the lower outlet stage of the second lift chamber, said mold release work station including a conveyor receiving and conveying the metal mold received from the second lift chamber and means for releasing and removing a cured item from the received metal mold;

a second push-in cylinder coupled to said second lift chamber for transferring the metal mold from the lower outlet stage of the second lift chamber onto said conveyor of said mold release work station;

a third lift chamber for receiving the empty metal mold from the conveyor of the mold release work station, said third lift chamber having an outlet and including a third lift for lowering the empty metal mold to the outlet of the third lift chamber which is at a position corresponding to the position of the mold transfer conveyor in the water tub; and a third push-in cylinder for transferring the empty metal mold onto the mold transfer conveyor of the water tub from said outlet of the third lift chamber for cooling of the metal mold in said water tub;

said conveyors of said water tub, of said ceiling oven and of said mold release work station being separate from each other and independent of each other.

2. The mold equipment of claim 1, wherein said ceiling oven includes means for heating said metal mold within said ceiling oven to about 100° to 200° C.

3. The mold equipment of claim 1 or claim 2, wherein said mold release work station cools the metal mold to a temperature of about 50° to 70° C.

4. The mold equipment of claim 1, wherein said water tub includes an area whereat a foamable solution is injected into a metal mold which is cooled in the water tub.

5. The mold equipment of claim 4, wherein said foamable solution is raw material for producing a polyurethane foam.

6. The mold equipment of any one of claims 1, 2 or 4, wherein said water tub has a water level sufficient to submerge at least a major portion of the metal mold in the water in said water tub.

7. The mold equipment of claim 6, wherein the upper portion of the metal mold is not submerged in the water in said water tub.

8. The mold equipment of claim 1, wherein said first, second and third lifts each comprise a motor driven elevator.

9. The mold equipment of claim 1, wherein each of said conveyors comprises a roller conveyor.

10. The mold equipment of claim 1, wherein said first and second lift chambers are spaced apart, and said ceiling oven spans the distance between said first and second lift chambers, and the interior of said ceiling oven communicates with the interiors of said first and second lift chambers.

11. The mold equipment of claim 10, wherein the ceiling oven and said lift chambers are in communication so as to provide an air circulation path which includes said lift chambers, water tub, ceiling oven and mold release work station.

12. The mold equipment of claim 10 or claim 11, wherein said ceiling oven is located above said water tub and above said mold releasing work station, the combination of said water tub and mold releasing work station spanning the distance between said first and second lift chambers.

13. The mold equipment of claim 12, wherein each of said conveyors comprises a roller conveyor.

14. The mold equipment of claim 10 or claim 11, wherein each of said conveyors comprises a roller conveyor.

15. The mold equipment of any one of claims 9, 10, or 11, wherein said conveyors are all mounted to extend in a substantially horizontal direction.

* * * * *